United States Patent [19]

Vaughan, deceased et al.

[11] Patent Number: 4,608,136
[45] Date of Patent: * Aug. 26, 1986

[54] OXIDATION OF CARBONACEOUS MATERIAL AND ELECTRODEPOSITION OF A METAL AT THE CATHODE OF AN ELECTROLYTIC CELL

[75] Inventors: Ronald J. Vaughan, deceased, late of Orinda, Calif.; by Bank of America NT&SA, administrator, Walnut Creek, Calif.

[73] Assignee: Chevron Research Company, San Francisco, Calif.

[*] Notice: The portion of the term of this patent subsequent to Jun. 21, 2000 has been disclaimed.

[21] Appl. No.: 759,538

[22] Filed: Jul. 26, 1985

Related U.S. Application Data

[63] Continuation-in-part of Ser. No. 653,980, Sep. 21, 1984, abandoned, which is a continuation-in-part of Ser. No. 496,798, May 23, 1983, abandoned.

[51] Int. Cl.$^4$ .............................................. C25C 1/00
[52] U.S. Cl. ............................... 204/106; 204/105 R; 204/108; 204/109; 204/112; 204/114; 204/119; 423/40; 423/138; 75/104; 75/119
[58] Field of Search ....... 204/105 R, 105 M, 106–108, 204/109–119; 423/138, 40; 75/104, 119

[56] References Cited

U.S. PATENT DOCUMENTS

| | | | |
|---|---|---|---|
| 3,761,369 | 9/1973 | Tirrell | 204/108 |
| 3,920,791 | 11/1975 | Meyers | 423/461 |
| 4,081,338 | 3/1978 | Golovoy | 204/149 |
| 4,194,972 | 3/1980 | Weintraub et al. | 210/44 |
| 4,268,363 | 5/1981 | Coughlin | 204/108 |
| 4,341,608 | 7/1982 | St. John | 204/129 |
| 4,389,288 | 6/1983 | Vaughan | 204/101 |
| 4,405,420 | 9/1983 | Vaughan | 204/114 |
| 4,412,893 | 11/1983 | Fray | 204/105.2 |

FOREIGN PATENT DOCUMENTS 2087431  5/1982  United Kingdom ............ 204/105 R

OTHER PUBLICATIONS

"Electrochemical Studies of Coal Slurry Oxidation Mechanisms", by Dooge et al., J. Electrochemical Soc., Aug., 1982, p. 1719.
Websters 7th New Collegiate Dictionary, p. 489.
"Principles of Extractive Metallurgy", vol. 2, F. Habashi, Grodon & Breach Publishers, 1970, p. 189.
Merck Index, 3960 and 3982 (10th Ed.).
Rallo, "Anodic Oxidation of Coal Slurries", Internat'l Soc. of Electrochem.
"High Rate of Aqueous Anodic Oxidation of Carbonaceous Crude Fuels", by Clarke et al., ECS, May 1983.

Primary Examiner—R. L. Andrews
Attorney, Agent, or Firm—S. R. LaPaglia; R. C. Gaffney; G. F. Swiss

[57] ABSTRACT

A metal is electrodeposited in a continuous cyclic electrolytic/carbon oxidation process wherein ferrous ion is oxidized at the anode and a metal is deposited at the cathode of an electrolytic cell. The ferric ions produced at the anode are thereafter reduced to ferrous ions by contact with a solid carbonaceous material and the ferrous ions are recycled for electrochemical reoxidation.

11 Claims, 3 Drawing Figures

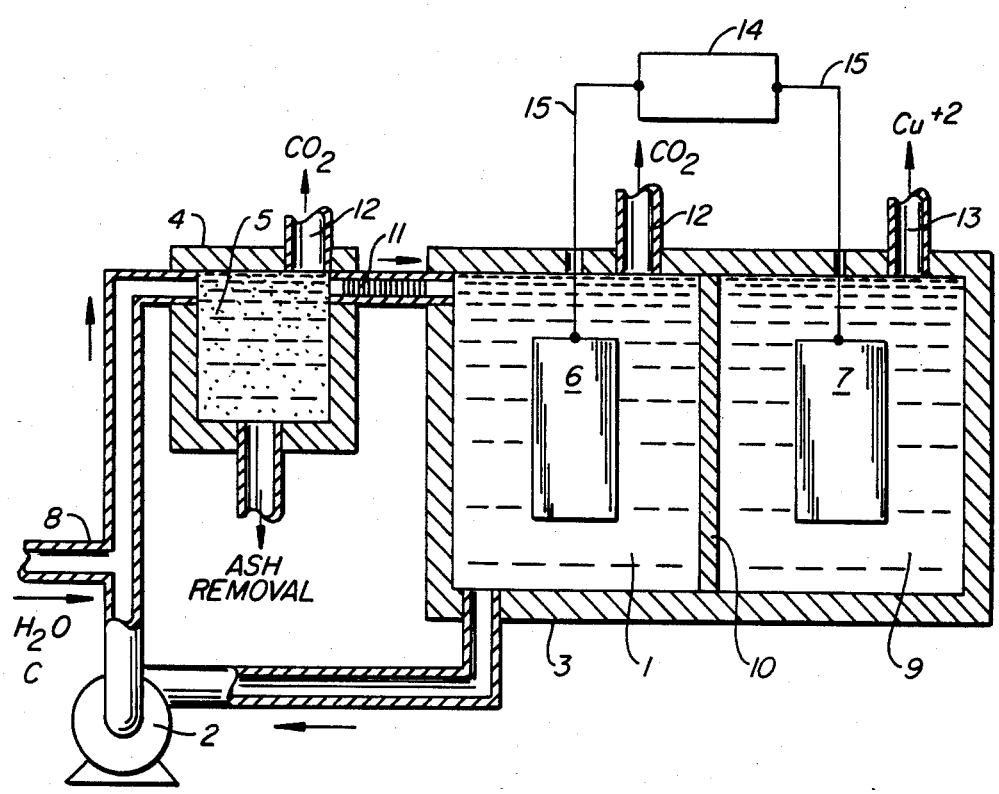
FIG._1.

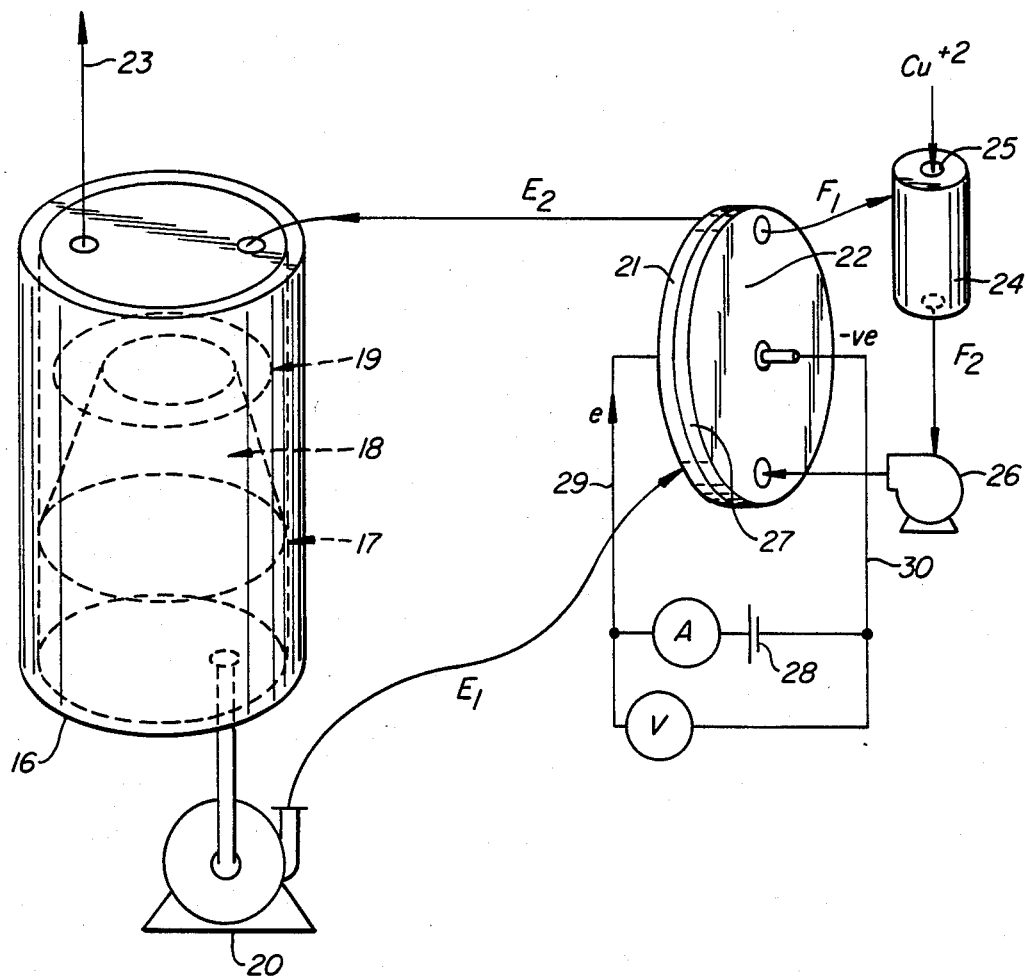
FIG._2.

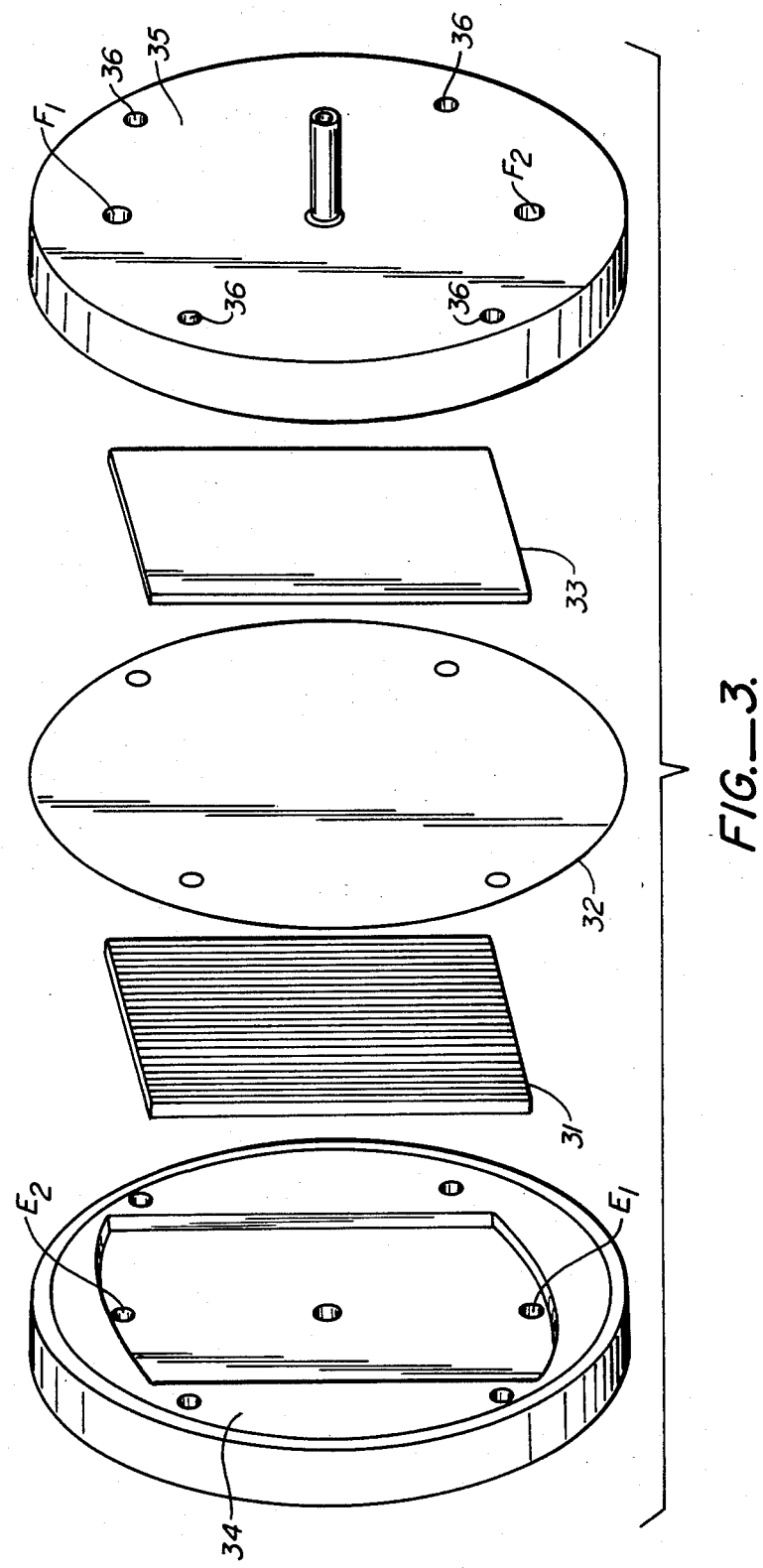

OXIDATION OF CARBONACEOUS MATERIAL AND ELECTRODEPOSITION OF A METAL AT THE CATHODE OF AN ELECTROLYTIC CELL

CROSS-REFERENCE TO RELATED APPLICATIONS

This application is a continuation-in-part of pending U.S. Ser. No. 653,980 filed Sept. 21, 1984, and which is now abandoned which in turn is a continuation-in-part of U.S. Ser. No. 496,798, filed May 23, 1983, and now abandoned.

BACKGROUND OF THE INVENTION

A. Field of the Invention

This invention relates to a continuous process for depositing a metal at the cathode of an electrolytic cell. More particularly, the invention is concerned with a continuous cyclic technique wherein (a) $Fe^{+2}$ ion is oxidized to $Fe^{+3}$ in an aqueous acidic electrolyte at the anode of an electrolytic cell with the corresponding electrodeposition of a metal at the cathode, and (b) the reduction of $Fe^{+3}$ generated at the anode with a solid carbonaceous reductant material to $Fe^{+2}$ for subsequent reuse in the process.

B. Prior Art

It is well known that carbon and carbonaceous materials may be oxidized at the anode in aqueous electrolyte in an electrochemical cell through which a direct current flows.

Recently, a renewed interest in the electrochemical oxidation of carbonaceous materials has developed wherein coal-assisted generation of hydrogen, or deposition of metals, has been proposed. Thus, U.S. Pat. No. 4,268,363 teaches the electrochemical gasification of carbonaceous materials by anodic oxidation which produces oxides of carbon at the anode and hydrogen or metallic elements at the cathode of an electrolysis cell.

U.S. Pat. No. 4,226,683 teaches the method of producing hydrogen by reacting coal or carbon dust with hot water retained as water by superatmospheric pressure. The pressure is controlled by the use of an inert dielectric liquid which washes the electrodes and while doing so depolarizes them by absorption of the gases.

U.S. Pat. No. 4,233,132 teaches a method wherein the electrodes are immersed within oil which forms a layer over a quantity of water. When current is passed between the electrodes, water is caused to undergo electro-decomposition. Gaseous hydrogen is collected in the sealed space above the oil-water layers, and the oxygen is believed to react with the constituents in the oil layer.

These represent some of the prior art in attempting to produce useful rates of electrochemically assisted oxidation of carbonaceous fuels. A further example is the use of carbonaceous fuels at the anode of a fuel cell, such devices having failed to achieve comxercial realization due to the products of combustion reducing the efficiency of the system, tars forming on the catalytic surfaces, and the poisoning effect of sulfur and CO.

As acknowledged in U.S. Pat. No. 4,226,683, the principal problem in the past use of this technology was the slow rate of the electrochemical reaction of coal or carbon and water at the anode.

U.S. Pat. No. 3,761,369 teaches the cathodic electrodeposition of copper accompanied by anodic oxidation of $Fe^{+2}$ to $Fe^{+3}$.

U.S. Pat. No. 4,202,744 teaches a method wherein elemental iron is oxidized in an aqueous solution of an alkali metal hydroxide at the anode of an electrolytic cell with simultaneous generation of hydrogen at the cathode. The iron oxidation products of the reaction are thereafter reduced to elemental iron by contact with a carbonaceous reducing agent at elevated temperatures and the reduced material recycled for reoxidation. Carbon monoxide is the preferred reducing agent and temperatures above 1000° F. are recommended.

Fray et al, British Patent Application No. 2,087,431A and U.S. Pat. No. 4,412,893, disclose that iron (III) ions generated at the anode of an electrochemical cell may be reduced to iron (II) ions by contacting the iron (III) ions with lignite at a temperature greater than 40° C. in a vessel external to the cell.

U.S. Pat. No. 4,405,420 of common inventive entity and assignee to this application, discloses that iron, when added to an electrolyte containing carbonaceous material at the anode, and preferably iron in the +2 and +3 valence state, catalyzes the rate of reaction significantly, in some instances higher than two orders of magnitude over the uncatalyzed system with concurrent electrodeposition of a metal at the cathode, which application is incorporated by reference.

A process whereby an aqueous acidic flow of iron (II) is oxidized to iron (III) at the anode of an electrochemical cell and then cycled to a carbonaceous bed wherein it is reduced to iron (II) in a continuous manner significantly enhances the commercial feasibility of the process. Such a continuous process would necessarily require that the carbonaceous material and operating conditions be of such a nature as to allow for sustained oxidation of the carbonaceous material since an unsustained oxidation of the carbonaceous material would require constant interruption of the flow in order to replenish the carbonaceous reductant material.

As used herein, the terms "sustained oxidative reactivity", "sustained oxidation of the carbonaceous material" and the like, means that the oxidation rate of the carbonaceous material does not exhibit significant decay due to the inability of the iron (II) ions to penetrate the oxidized surface of the carbonaceous material. For the purpose of this definition, the rate of oxidation of the carbonaceous material with iron (III) ions may be expressed as the rate of formation of iron (II). The overall reaction order for this process is believed to be $$\frac{dFe^{II}}{dt} = k(Fe^{III})^2(H^+)^{3/4}(Csurf)^3$$

wherein Csurf represents available non-oxidized carbon surface on the carbonaceous material. Sustained rates for the purpose of this invention are those wherein the reaction rate, as defined above, is maintained at least at $1 \times 10^5$ Mol$^{-1}$ Min$^{-1}$ for a period of at least 5 hours.

It has now been found that in order to sustain such a reaction rate for the oxidation of the carbonaceous material in a continuous process, the following criticalities must be met:

1. The surface area of the carbonaceous material must be substantially free of carboxylic or carbonyl groups in order to allow penetration of the iron (III) ions onto the non-oxidized carbon surface thus allowing the generation of iron (II) ions. Generally, carbonaceous materials which are substantially free of carboxylic or carbonyl groups are those which contain less than 30% oxygen as carboxylic or carbonyl groups. Accordingly, carbonaceous materials which contain greater than 30% oxygen as carboxylic or carbonyl groups (lignite) are not suitable for this invention.

2. Temperatures of 120° C. and greater.

Temperatures of 120° C. and greater are particularly surprising in view of Farooque et al, Fuel, 58, 705–7515, October 1978, where it was stated that it would be possible to consume coal to a much larger extent at a meaningful rate by conducting the electrochemical gasification at temperatures of 200° C. and greater.

After oxidation of the carbonaceous material to about 30% oxygen (as carboxylic or carbonyl groups), the rate of reaction slows becoming more dependent upon the decomposition of the oxidized carbonaceous material—that is upon the rate of decarboxylation ($CO_2$ elimination) from the carbonaceous material. The rate of decarboxylation is slow and does not approach a sustained rate until temperatures of about 270° C. and greater are employed. Accordingly, at 270° C. and above, carbonaceous materials containing greater than 30% oxygen as carboxylic or carbonyl groups will sustain the oxidative process in a continuous process since carboxylic groups are readily eliminated from the carbonaceous surface as $CO_2$.

SUMMARY OF THE INVENTION

As described above, it is well known that carbonaceous material such as coal can be oxidized at the anode of an electrochemical cell containing an aqueous acidic electrolyte with the simultaneous production of oxides of carbon at the anode and that this anodic halfcell reaction may be used in combination with the cathodic half-cell reaction of electrodeposition of a metal M from an aqueous solution of its ions $M^{m+}$. For example, focusing on the carbon in coal and representing it by C, this anodic reaction can be written according to the stoichiometry:

$$C_{(s)} + 2H_2O_{(l)} \rightarrow CO_{2(g)} + 4H^+ + 4e^- \tag{I}$$

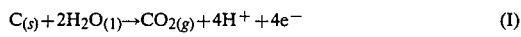

in combination with the simultaneous cathodic reaction $$M^{m+} + me^- \rightarrow M \tag{II}$$

The net reaction, that is the sum of equations (I) and (II) [for case m=1] is:

$$C_{(s)} + 2H_2O_{(l)} + 4M^+ \rightarrow CO_{2(g)} + 4M + 4H^+ \tag{III}$$

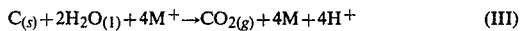

In these equations, the symbols (g), (s), and (l) symbolize the gaseous, solid, and liquid states, respectively. Equation (III), the reaction between coal and water, caused by impressing an appropriate potential on a suitable electrochemical cell, is what is referred to in U.S. Pat. No. 4,268,363 as the electrochemical gasification of coal, which reference is incorporated totally herein by reference.

In the case of copper, for example, the coal-assisted electrodeposition of copper would take the form:

$$C_{(s)} + 2H_2O_{(l)} + 2Cu^{2+} \rightarrow CO_{2(g)} + 2Cu_{(s)} + 4H^+ \tag{I}$$

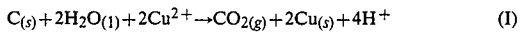

A problem with this prior art method is the relatively slow rate of reaction and the incomplete combustion of the carbonaceous material at the anode. As noted above, this problem is particularly acute in a continuous process.

Also, as disclosed in copending U.S. Pat. No. 4,405,420, the addition of a sufficient amount of iron preferably in the +2 or +3 valence state or mixtures thereof to the carbonaceous material undergoing oxidation in an aqueous acidic electrolyte at the anode will increase the rate of reaction of the oxidation process. The iron catalyst assists the oxidation of carbonaceous material at the anode in going to completion and increases the amount of current produced at the anode per given operating voltage.

It has now been found that solid carbonaceous material undergoing oxidation in the aqueous acidic electrolyte in the presence of $Fe^{+2}$ and $Fe^{+3}$ ions does not have to be present at the anode for a continuous electrodeposition of a metal at the cathode to take place. Sustained oxidation of the carbonaceous source can be accomplished away from the anode provided that either the temperature is maintained at greater than 120° C. while employing a carbonaceous source containing less than 30% oxygen as carboxylic or carbonyl groups or (2) the temperature is maintained at greater than about 270° C.

The present invention is directed to a continuous process of electrowinning a metal from an aqueous acidic electrolyte solution containing ions of the metal, at the cathode of an electrolytic cell by anode-assisted electrolysis comprising: (a) passing an aqueous acidic electrolyte solution containing $Fe^{+2}$ ions and ions of the metal to be deposited to an electrolytic cell comprising an anode and a cathode; (b) passing a direct electric current through said solution thereby to deposit said metal on said cathode and to oxidize at least a portion of said $Fe^{+2}$ ions to $Fe^{+3}$ ions at the anode; (c) passing said solution containing the $Fe^{+3}$ ions from the cell; (d) reducing the $Fe^{+3}$ ion oxidation product in the aqueous acidic electrolyte solution to $Fe^{+2}$ ions by contacting the same with a solid carbonaceous reducing agent at a temperature in the range of from 120° C. to 350° C. wherein said solid carbonaceous reducing agent has an oxygen content of less than 30% oxygen as carboxylic or carbonyl groups; and (e) recycling at least a portion of the aqueous acidic electrolyte containing the $Fe^{+2}$ ions from step (d) to step (a).

According to this invention, it is possible to continuously electrowin, electroplate, or electrodeposit any element that can be cathodically reduced from solution with simultaneous electrochemical anodic oxidation of $Fe^{+2}$ ion. Typical metallic elements often deposited in practice from aqueous electrolytes include Cr, Mn, Co, Ni, Ag, Cu, Zn, Ga, Cd, In, and Tl.

While not being limited by the theory involved in the process, it is believed that $Fe^{+3}$ ions react spontaneously with the carbon or hydrocarbon surface to form $Fe^{+2}$ ions. The $Fe^{+2}$ ions are oxidized by the anode electrode. in preference to either the direct oxidation with carbon or the electrolysis of water, i.e., the evolution of $O_2$ at the anode. For the oxidation reaction of $Fe^{+2}$ to $Fe^{+3}$ at the anode, depending upon anions present, temperature, etc. this voltage is about $E° = 0.77$ volts. The presence of the iron catalyst does not interfere with the oxidation of $S^-$ to $SO_4^-$ or the oxidation of nitrogen groups which may be present on the carbonaceous material. This is characteristic of the electrochemical oxidation process and different from the direct oxidation of fuels by air, alone. The oxygen is provided by water which is present in abundance.

As noted above, in order to efficiently operate the continuous oxidative process of this invention at less than 270° C., it is necessary that the carbonaceous fuel employed be one which would sustain the oxidative reaction.

Suitable fuels for this purpose are carbonaceous materials containing less than 30% oxygen as carboxylic or carbonyl groups and includes solid materials such as tars, coal, coke, biomass, sewage, sludge, wood flour, corn husks, vegetable matter, and the like. The process is unlike the oxidation of fuels in air, both in principle and effect. The products of the electrochemical or catalyzed oxidation do not contain significant amounts of partially combusted material such as finely divided aerial smokes, CO, sulfur dioxide, and nitrogen oxides characteristic of combustion with air or oxygen; however, a unique set of products are produced due to the very different mechanism of carbon oxidation with water and subsequent hydrolysis of the initial oxidation products. The rate of the oxidation of the carbonaceous material in the electrolyte has been found to be influenced by the presence of a catalyst $Fe^{+3}$ ion, which is inexpensive, nontoxic, and abundant.

BRIEF DESCRIPTION OF THE DRAWINGS

While not essential to the understanding of the invention, the invention will be better understood by reference to the appended drawings in which:

FIG. 1 is a schematic diagram of an electrowinning cell showing the operation of the continuous feed of electrolyte containing the ferrous-ferric ions to the anode compartment after contacting solid carbonaceous material external to the anode compartment;

FIG. 2 is a schematic representation of a preferred system showing the separation of coal or other solid carbonaceous material from the anode compartment of the electrochemical cell through which the electrolyte must pass and make contact with; and FIG. 3 is a schematic representation of a cell containing an anode, cathode and membrane separator.

DETAILED DESCRIPTION OF THE INVENTION

In accordance with the present invention, there is provided a two-step method for electrodepositing a metal at the cathode on electrolytic cell. Broadly, the first step comprises reacting a carbonaceous material, water and $Fe^{+3}$ ions to form reaction products including partially oxidized organic products such as polycarboxylic acids, phenolic compounds, quinones, sulfones, and of course $CO_2$, $Fe^{+2}$ ions, and $H^+$ ions. In a second step, the $Fe^{+2}$ ions are reacted at the anode in an electrochemical cell to produce $Fe^{+3}$ ions with simultaneous electrodeposition of a metal at the cathode. The $Fe^{+3}$ ions are recovered for recycle to the first step for reaction with additional carbonaceous material and water.

More specifically, the process may be described in terms of two distinct parts. Part 1 is the oxidation of crude fuel with the $Fe^{+3}$ ion catalyst in an acidic aqueous electrolyte, producing products of combustion such as $CO_2$, carboxylated carbon compounds and $H^+$ ions. The iron catalyst is itself reduced to $Fe^{+2}$ ions. The reactions may be written as follows:

$$C + 2H_2O + 4Fe^{+3} \rightarrow CO_2 + 4Fe^{+2} + 4H^+$$

where C is the carbonaceous material or crude fuel. Part 2 is the electrolytic cell reaction wherein $Fe^{+2}$ is oxidized to $Fe^{+3}$ at the anode, the transport of the protons produced through the membrane or barrier into the cathode compartment and the simultaneous reduction and deposition of a metal on the cathode. The reactions may be written as follows:

$$4Fe^{+2} - 4e^- \rightarrow 4Fe^{+3} \quad E° = 0.77 \text{ volts At the anode.}$$

$$M^{m+} + me^- \rightarrow M \text{ At the cathode.}$$

According to the process of this invention, electrode potentials of about 0.4 to 0.8 volts versus the Standard Calomel Electrode are suitable in carrying out the electrochemical reaction described in step 2 above, i.e., the oxidation of $Fe^{+2}$ to $Fe^{+3}$ ions and the electrodeposition of a metal at the cathode.

The present invention, therefore, provides for the continuous electrodeposition of a metal at the cathode without the necessity of having solid carbonaceous materials making contact with the anode. The invention further provides for a xethod wherein $Fe^{+2}$ ion which is oxidized to $Fe^{+3}$ ion at the anode can be regenerated by reaction with a carbonaceous material as part of an in-line continuous cyclic process.

A further benefit of this invention is the fact that the reaction conditions with respect to temperature and pressure can be the same for Parts 1 and 2 described above, or they may be different. For example, it may be preferable to use higher temperatures and pressures for the oxidation of the solid carbonaceous fuel wherein $Fe^{+3}$ is reduced to $Fe^{+2}$ as compared to electrochemical reactions wherein $Fe^{+2}$ is oxidized to $Fe^{+3}$ at the anode and the metal is electrodeposited at the cathode.

The electrolytic cell reactions are typically conducted at temperatures from above the freezing point of water to temperatures of about 400° C. Temperatures of from about 25° C. to 350° C. are preferred and from about 90° C. to 300° C. are most preferred.

The oxidation of the carbonaceous material is generally conducted at from 120° C. to 350° C. with temperatures of from greater than 140° C. being preferred. At temperatures below 120° C., the reactivity of solid carbonaceous materials such as coke steadily decreases as the oxidation proceeds. This decreased reactivity is believed to be caused by oxygen-containing functional groups building on the surface of the coke which hinders further sustained reactivity of the crude fuel. At temperatures of about 120° C. and greater, preferably 140° C. and greater, the reactivity of the carbonaceous material is sustained and no substantial decrease is observed.

Since it is desired to maintain the reaction in a liquid phase, it is, of course, necessary that at elevated temperatures, the reaction be carried out at elevated pressure. Generally, pressures of from about 2 to 400 atmospheres are satisfactory.

Carbonaceous materials where possess sustained reactivity and are thus suitable for use in accordance with the present invention include fuels such as: bituminous coal, chars made from coal, active carbons, coke, carbon black, and graphite; wood or other lignocellulosic materials, including forest products such as wood waste, wood chips, sawdust, bark, shavings, and wood pellets; various biomass materials such as land or marine vegetation or its waste after other processing, including grasses, various cuttings, crops and crop wastes, coffee grounds, leaves, straw, pits, hulls, shells, stems, husks, cobs and waste materials including animal manure; sewage sludge resulting from municipal treatment plants, and the scraps of wastes formed in the production of rubber and of plastics such as polyethylene, cellulose acetate, and the like. Thus, any solid fuel or organic waste material which possesses sustained reactivity, provides a suitable source of carbonaceous material for use according to this invention.

Acidic aqueous electrolytes having a pH range of greater than 0 to 6 pH may be used; the limiting factor is the solubility of the iron catalyst. The preferred acidic aqueous electrolytes that can be employed have a pH of less than 3 and include solutions of strong acids such as sulfuric acid, nitric acid, hydrochloric acid, phosphoric acid, and the like or mixtures thereof.

Iron may be used in its $+2$ and $+3$ valence states. Thus, inorganic iron compounds such as iron oxides, iron carbonate, iron silicates, iron sulfide, iron oxide, iron hydroxide, iron halides, iron sulfate, iron nitrate, and the like, may be used. Also, various organic iron salts and complexes such as salts of carboxylic acids, e.g., iron acetates, iron citrates, iron formates, iron glyconates, and the like, iron cyanide, iron chelate compounds such as chelates with diketones as 2,4-pentanedione, iron ethylene diaminetetracetic acid, iron oxalates, and the like.

While the iron catalyst may be used at a concentration up to the saturation point in the aqueous electrolyte, the preferred range of iron catalyst is in the range of from 0.04 to 0.5 molar, preferably 0.05 to 0.5 molar and most preferably from 0.05 to 0.2 molar concentration. While certain carbonaceous materials such as coal may contain iron as an impurity, an iron-containing catalyst from an external source is generally required in order to increase the rate of reaction, at least initially, to acceptable levels for commercial use. The iron catalyst can conceivably be generated in-situ by initially leaching iron from the coal and subsequently oxidizing sufficient iron-containing coal to generate an effective amount of iron catalyst in the electrolyte.

Of course, essentially iron-free carbonaceous materials, such as carbon black, require an iron catalyst to be added from an external source. However, the degree of iron addition may be adjusted to either increase the reaction rate, or, by opting to operate with very low concentrations of iron, operate at lower electrode potential and lower current density.

Thus, in one embodiment of this invention, sufficient iron in the form of $Fe^{+2}$ or $Fe^{+3}$ is added from an external source in order to supply the preferred range, namely 0.05 to 0.5 xolar or higher.

In a second embodiment, an effective amount of iron in the form of $Fe^{+2}$ or $Fe^{+3}$ can be generated in-situ by initially leaching iron ions from the coal and subsequently oxidizing sufficient iron-containing coal, albeit initially at a slower rate, to supply the preferred range of catalyst or higher.

The catalyst generated would then be freed from the coal and be able to function in a similar manner as externally supplied iron.

In a third embodiment, a combination of externally supplied iron and in-situ solubilized iron can be used to supply the preferred range of catalyst, i.e., 0.05 to 0.5 molar or higher.

The concentration or amount of carbonaceous material present in the electrolyte may vary over a wide range depending on particle size; however, the preferred range is from about 0.1 gram to 0.7 gram per ml. Another preferred range is from about 0.05 gram to 0.3 gram per ml. The preferred particle size range is 1 to 150 microns, more preferred is the range 5 to 25 microns. The rate of regeneration of $Fe^{+2}$ is indirectly proportional to the particle size of the carbonaceous material, however, larger particles are useful as they aid the separation of electrolyte from fuel.

The particular apparatus used to carry out the present invention is not critical.

FIG. 1 schematically shows an embodiment which provides oxidation of a carbonaceous material such as coal external to the anode compartment by $Fe^{+3}$, the oxidation of $Fe^{+2}$ ion to $Fe^{+3}$ ion at the anode, and the electrodeposition of a metal such as copper at the cathode.

As shown in the Figure, anolyte electrolyte 1 containing ferric ion is circulated by pump means 2 from the anode compartment 3 through an oxidation reactor compartment 4 external to the anode compartment and which contains a solid carbonaceous material 5. The ferric ion oxidizes the carbonaceous material and is thus reduced to ferrous ion. The anolyte containing the ferrous ion is returned to the anode compartment where it electrochemically reacts at the anode 6 to form ferric ions with the simultaneous electrodeposition of copper at the cathode 7. Carbonaceous material, required make up water or aqueous acidic electrolyte is fed at 8. The electrochemical cell also includes catholyte electrolyte 9, ion-permeable membrane 10, and xeans 11 for containing the carbonaceous material 5 in the reactor compartment such as a porous glass frit, spun or woven asbestos, porous reinforced polymers or an ion exchange membrane, and a means for removing $CO_2$ at 12 and for introducing $Cu^{2+}$ ions at 13. Anode 6 and cathode 7 of the electrochemical cell are electrically connected to DC power source 14 by wires 15. Any ash or partially oxidized material formed from the chemical oxidation of the carbonaceous material may be removed.

A salient feature of the process and apparatus of FIG. 1 is the electrodeposition of copper on cathode 7. Copper ions, $Cu^{2+}$ are fed to the cell at point 13 in a solution of suitable concentration and composition, e.g., an aqueous solution 20% in $CuSO_4$ and 20% in $H_2SO_4$. The cathode 7 may be of almost any electrical conductor and copper will deposit and build up on cathode 7 as the process progresses. Suitable types of designs for cathode 7 are given in aforesaid U.S. Pat. No. 3,804,733 and by Ammann et al in Chapter 51 of *Extractive Metallurgy of Copper, An International Symposium*, Vol. 11, ed. by Yannepoulos et al, The Metallurgical Society, N.Y. 1976. In preferred embodiments hereof it may be necessary and desirable to periodically remove cathode after considerable elemental copper metal has been deposited upon it and substitute a fresh cathode to accumulate more copper. Alternately, the process may be coupled to a powder producing metal recovery cell, or high surface area bed reactor. These types of designs, known to those skilled in the art of electrochemical engineering, allow continuous operation above and below the concentrations of metal in normally used metal winning. This concept considerably broadens the scope and utility of the invention. Such a cell is described in United Kingdom Patent BP No. 1,505,736.

FIG. 2 shows a preferred arrangement of reactor and cells with which the cycle may be arranged.

The reactor or digestor 16 is a pressure vessel with a separator means 17 for the solids which supports the bed 18. The anolyte electrolyte level is shown at 19. A pump 20 circulates the $Fe^{+2}$ anolyte electrolyte solution to the anode compartment 21 of the cell 22 as $E_1$ stream. The cell is shown as 22, the internal parts of which are described in FIG. 3, and has two flows, $E_1/E_2$ the anolyte, and $F_1/F_2$ the catholyte. $E_2$ is the exiting anolyte essentially $Fe^{+3}$ solution. This solution is circulated back to the reactor to oxidize the carbonaceous fuel and be reduced to $E_1$ stream containing essentially $Fe^{+2}$ solution which is recirculated to the cell.

The gaseous products from the reactor 16, essentially carbon dioxide and water vapors, are fed through 23 and vented.

The reservoir 24 is used to hold the electrolyte $F_1/F_2$ and into which $Cu^{2+}$ ions are fed at 25. A pump 26 circulates the $F_1/F_2$ catholyte electrolyte solution to the cathode compartment 27 wherein the metal is electrodeposited at the cathode.

It will be obvious to those skilled in the art that this system allows for reliable measurement of the mass and energy balances that are taking place in the reactor and in the electrochemical cell.

The presence of some solid crude fuel in the electrolyte at the anode may be beneficial. Firstly, it provides additional fuel to the electrode, especially beneficial when the concentration of $Fe^{+3}$ is declining at the upper end of the electrode; and secondly, the presence of fine particles would enhance the mixing process at the electrode-electrolyte interface.

The main benefit from separation of the bulk of the crude fuel from the circulating electrolyte to the cell is the problems associated with good cell design such as being able to generate high mass transport at the electrode and use of narrow cell gaps without the dangers of plugging the flow with solid material.

The crude fuel added to the reactor 16 as finely divided particles or as an oily waste or tar dispersed with coke or oxidized carbon powders, preferably has a particle size in the range of 1 to 150 microns. During the oxidation process, there is a natural reduction in the particle size of the solid carbonaceous material. Reduction in particle size has an effect on the rate of reaction, finely ground material has a larger surface area and therefore many more sites for oxidation to take place.

The reactor principle allows for a much larger degree of accommodation to be made for particle size distribution and type of fuel. For example, there are occasions when larger particle size in the order of 200 or 300 microns and larger may aid the management of the process by improving the filterability or separation of the oxidized products from the electrolyte stream during or at the end of the process.

The anode and cathode of the electrochemical cell are electrically connected to DC power source 28 by wires 29 and 30.

FIG. 3 is a schematic representation of cell 22 used in the preferred system described in FIG. 2. The cell was designed to operate above atmospheric pressure; however, the cell may also be operated at ambient. FIG. 3 shows an anode 31 which may be made from any material that will tolerate the chosen conditions of the electrolyte, temperature and pressure. Typical of the electrodes used include $RuO_2/TiO_2$ on a titanium substrate or $IrO_2/TiO_2$ on a titanium substrate; however, sintered titanium oxide, $Ti_4O_7$, known commercially as Ebinex ®, would serve equally as well. The membrane 32 was made from Nafion ®, a resin composed of polytetrafluoroethylene and having terminal sulfonic acid groups. These membranes are available commercially and are used as cationic exchangers in a variety of industrial processes. Alternatively, in some embodiments of the invention the membrane may be dispensed with in those instances where there are conditions which preclude the reduction of $Fe^{+3}$ ion to $Fe^{+2}$ ion at the cathode because of the preferred deposition of metal as the current carrying processes.

The internal body of the cell 34, that part exposed to the acid electrolyte and catalyst, as well as the pumps, lines, and digestor 16, were made from Teflon. Alternative materials would be high-density polyethylene, glass filled resin, Kynar ®, and other plastics and special rubbers capable of performing in this environment. The outer casing 35 was made from steel or stainless steel.

The unit is bolted together through holes 36 to form a leak-free, two-compartment cell having entry and exist ports for both electrolyte streams $E_1/E_2$ and $F_1/F_2$ described hereinabove.

Many different types of electrolytic cell configurations may be employed in carrying out the $Fe^{+2}$ ion oxidation/metal electrodeposition reactions. Substantially the same apparatus and techniques that are used for electrochemical processing, i.e., parallel plate reactors, tank reactors, etc. for the electrodeposition of metals can be used with the method of this invention. Any selection or appropriate changes in use of materials and/or techniques is well within the skill of those versed in the art to which this invention applies. For example, the electrodes may be Pt, or other suitable conductors, and preferred embodiments will make use of chemically inert materials for the anode and materials of low hydrogen overvoltage for the cathode or the same metal as is being deposited. Anode materials which were found especially well suited include $RuO_2/TiO_2$ on a Ti substrate or $IrO_2/TiO_2$ on a Ti substrate, which anodes are both commercially available. Cathodes, 33, may be of nickel/ aluminum, steel, copper, or one of the precious metals.

An ion-exchange membrane or diaphragm can optionally and preferably be used to separate the anode and cathode compartments of the electrolytic cell. As a cation-exchange membrane, a perfluorosulfonic acid resin can be used which has a transport number for hydrogen ion close to unity, and in this system as well as a low electrical resistance. The "Nafion ®" membranes available commercially are suitable. An anion-exchange membrane or a porous diaphragm may also be useful in some instances.

When the standard electrode potential of the metal being deposited is less noble than that of $Fe^{+2}/Fe$, such as Zn, Mn and Cr, it is preferable to use an ionselective membrane or diaphragm between the anode and the cathode to prevent deposition of the iron instead of the desired metal.

By this invention it is possible to electrowin, electroplate or electrodeposit any element that can be cathodically reduced from solution with simultaneous electrochemical anodic oxidation of $Fe^{+2}$ ions. Typical metallic elements often deposited in practice from aqueous electrolytes of an appropriate salt include Ag, Cr, Mn, Co, Ni, Cu, Zn, Ga, Cd, In and Tl. Preferably the metallic elements are Cu, Zn, Ni, and Pb.

The concentration of the metal salt in the aqueous electrolyte may range from about 100 ppm to the saturation point and preferably from 5 grams to 50 grams per liter.

The following examples will serve to illustrate the invention.

EXAMPLE 1

A sample of coal, 400 grams with an average particle size of 50 microns and having a composition of C 68.2%, H 4.46%, N 1.41%, S 3.46%, O 18%, Fe 1.3%, Al 1.1%, is placed in the oxidation reactor or digestor similar to the reactor 16 shown in FIG. 2. 1.5 Liters of 5M sulfuric acid containing 0.1M $Fe_2(SO_4)_3$ solution are added to the anode compartment and digestor section of an electrolytic cell similar to that shown in FIG. 2. The solution is heated to 180° C. and pumped through the digestor and anodic chamber of the electrolytic cell at a rate of 15 liters/minute.

500 Ml of catholyte consisting of 5M sulfuric acid solution containing 2.0M copper sulfate is circulated through the cathode compartment at the same temperature and pressure as the anolyte, the pressure of the system being controlled by a nitrogen pressured Grove Loader not shown in FIG. 2.

A current of 6 amps corresponding to a current density of about 120 mA cm$^{-2}$ is passed for 4 hours. Electrodeposited copper is recovered from the cathode. The anode is 50 cm$^2$ of iridium oxide/titanium dioxide coated with titanium; the cathode is copper. A Nafion ® membrane separates the anode and cathode compartments. When the circulation of the anolyte electrolyte through the carbonaceous material is terminated, the current drops to zero as the ferric sulfate concentration is depleted at the anode. Normal operating conditions are reestablished when the electrolyte circulation through the carbonaceous material is resumed.

In a similar manner, silver, nickel, and cobalt may also be electrodeposited at the cathode.

What is claimed is:

1. A method of electrowinning a metal from an aqueous acidic electrolyte solution containing ions of the metal at the cathode of an electrolytic cell by anode-assisted electrolysis comprising:
   (a) passing an aqueous acidic electrolyte solution of pH 3 or less containing $Fe^{+2}$ ions and ions of the metal to be deposited to an electrolytic cell comprising an anode and a cathode;
   (b) passing a direct electric current through said solution thereby to deposit said metal on said cathode and to oxidize at least a portion of said $Fe^{+2}$ ions to $Fe^{+3}$ ions at the anode;
   (c) passing said solution containing the $Fe^{+3}$ ions from the cell;
   (d) reducing the $Fe^{+3}$ ion oxidation product in the aqueous acidic electrolyte solution to $Fe^{+2}$ ions by contacting the same with a solid carbonaceous reducing agent containing less than 30% oxygen as carboxylic or carbonyl groups at a temperature in the range of from 120° C. to 350° C. and wherein the particle size of said solid carbonaceous reducing agent is from 1 to 150 microns; and
   (e) recycling at least a portion of the aqueous acidic electrolyte containing the $Fe^{+2}$ ions from step (d) to step (a); and with the proviso that the total iron concentration as either $Fe^{+2}$ and/or $Fe^{+3}$ in said aqueous acidic electrolyte is from about 0.04 to 0.5 molar.

2. The method according to claim 1 wherein the electrochemical process of step (b) is conducted at a temperature of from about 25° C. to 350° C.

3. The method according to claim 1 wherein the reduction of $Fe^{+3}$ to $Fe^{+2}$ by contacting the $Fe^{+3}$ with said carbonaceous reducing agent of step (d) is conducted at a temperature ranging from 120° C. to 300° C.

4. The method according to claim 1 wherein said carbonaceous material is selected from the group consisting of coal, char, coke, charcoal, soot, carbon black, activated carbon, asphalt, graphite, wood, biomass materials or sewage sludge.

5. The method according to claim 1 wherein said metal is selected from the group consisting of Cr, Mn, Co, Ni, Ag, Cu, Zn, Ga, Cd, In, and Tl.

6. The method according to claim 5 wherein said metal is Cu, Zn, Pb, or Ni.

7. A method of electrowinning a metal from an aqueous acidic electrolyte solution containing ions of the metal at the cathode of an electrolytic cell by anode-assisted electrolysis comprising:
   (a) passing an aqueous acidic electrolyte solution of pH 3 or less containing $Fe^{+2}$ ions and ions of the metal to be deposited to an electrolytic cell comprising an anode and a cathode;
   (b) passing a direct electric current through said solution thereby to deposit said metal on said cathode and to oxidize at least a portion of said $Fe^{+2}$ ions to $Fe^{+3}$ ions at the anode;
   (c) passing said solution containing the $Fe^{+3}$ ions from the cell;
   (d) reducing the $Fe^{+3}$ ion oxidation product in the aqueous acidic electrolyte solution to $Fe^{+2}$ ions by contacting the same with a solid carbonaceous reducing agent at a temperature in the range of from 270° C. to 350° C. and wherein the particle size of said solid carbonaceous reducing agent is from 1 to 150 microns; and
   (e) recycling at least a portion of the aqueous acidic electrolyte containing the $Fe^{+2}$ ions from step (d) to step (a); and with the proviso that the total iron concentration as either $Fe^{+2}$ and/or $Fe^{+3}$ in said aqueous acidic electrolyte is from about 0.04 to 0.5 molar.

8. A method of electrowinning a metal from an aqueous acidic electrolyte solution containing ions of the metal at the cathode of an electrolytic cell by anode-assisted electrolysis comprising:
   (a) passing an aqueous acidic electrolyte solution of pH 3 or less containing $Fe^{+2}$ ions and ions of the metal to be deposited to an electrolytic cell comprising an anode and a cathode;
   (b) passing a direct electric current through said solution thereby to deposit said metal on said cathode and to oxidize at least a portion of said $Fe^{+2}$ ions to $Fe^{+3}$ ions at the anode;
   (c) passing said solution containing the $Fe^{+3}$ ions from the cell;
   (d) reducing the $Fe^{+3}$ ion oxidation product in the aqueous acidic electrolyte solution to $Fe^{+2}$ ions by contacting the same with a solid carbonaceous reducing agent selected from the group consisting of coal, char, coke, charcoal, soot, carbon black, activated carbon, asphalt, graphite, wood, geomass materials or sewage at a temperature in the range of from about 140° C. to about 350° C.; and wherein the particle size of said solid carbonaceous reducing agent is from 1 to 150 microns; and
   (e) recycling at least a portion of the aqueous acidic electrolyte containing the $Fe^{+2}$ ions from step (d) to step (a) and with the proviso that the total iron concentration as either $Fe^{+2}$ and/or $Fe^{+3}$ in said aqueous acidic electrolyte is from about 0.04 to 0.5 molar.

9. The method according to claim 8 wherein the electrochemical process of step (b) is conducted at a temperature of from about 25° C. to 350° C.

10. The method according to claim 8 wherein said metal is selected from the group consisting of Cr, Mn, Co, Ni, Ag, Cu, Zn, Ga, Cd, In, and Tl.

11. The method according to claim 10 wherein said metal is Cu, Zn, Pb, or Ni.

* * * * *